US011426819B2

(12) United States Patent
Ottnad et al.

(10) Patent No.: US 11,426,819 B2
(45) Date of Patent: Aug. 30, 2022

(54) PREDICTING THE TILT INCLINATION OF A WORKPIECE PORTION AND SEPARATING A PLATE-LIKE WORKPIECE

(71) Applicant: TRUMPF Werkzeugmaschinen GmbH + Co. KG, Ditzingen (DE)

(72) Inventors: Jens Ottnad, Karlsruhe (DE); Carsten Krenz, Leinfelden-Echterdingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 362 days.

(21) Appl. No.: 16/391,510

(22) Filed: Apr. 23, 2019

(65) Prior Publication Data

US 2019/0247961 A1  Aug. 15, 2019

Related U.S. Application Data

(63) Continuation of application No. PCT/EP2017/076925, filed on Oct. 20, 2017.

(30) Foreign Application Priority Data

Oct. 24, 2016  (DE) .......................... 102016220844.6

(51) Int. Cl.
*B23K 26/38* (2014.01)
*B23K 37/02* (2006.01)
(Continued)

(52) U.S. Cl.
CPC .......... *B23K 26/38* (2013.01); *B23K 26/0876* (2013.01); *B23K 26/16* (2013.01);
(Continued)

(58) Field of Classification Search
CPC ... B26D 5/28; B26D 1/30; B26D 5/04; B23Q 1/037; B23Q 2240/005; B23K 37/0408;
(Continued)

(56) References Cited

U.S. PATENT DOCUMENTS 5,556,554 A    9/1996  Morishita
2009/0250445 A1  10/2009  Yamaguchi et a.
(Continued)

FOREIGN PATENT DOCUMENTS

CN  101687279 A  3/2010
CN  103056512    4/2013
(Continued)

OTHER PUBLICATIONS

CN Office Action in Chinese Appln. No. 201780065804.1, dated Aug. 3, 2020, 17 pages (with English translation).
(Continued)

*Primary Examiner* — John J Norton
(74) *Attorney, Agent, or Firm* — Fish & Richardson P.C.

(57) ABSTRACT

The invention relates to a method for predicting the tilt inclination of a workpiece part that is being cut free from a remaining workpiece using a machine tool during a machining process, and that rests on one or more supports, said method comprising the following steps: determining one or more possible tilt edges about which the workpiece part being cut free might tilt. For at least one potential tilt edge, particularly for each potential tilt edge, determining tilt moments that act on the workpiece part in different states of the machine tool, and on the basis of the determined tilt moments, determining whether the workpiece part would tilt about a tilt edge.

19 Claims, 3 Drawing Sheets

(51) Int. Cl.
  *B23K 37/04* (2006.01)
  *B23K 26/08* (2014.01)
  *B23K 26/16* (2006.01)
  *B26F 3/00* (2006.01)
  *B23K 101/18* (2006.01)

(52) U.S. Cl.
  CPC ...... *B23K 37/0235* (2013.01); *B23K 37/0461* (2013.01); *B26F 3/004* (2013.01); *B23K 2101/18* (2018.08)

(58) Field of Classification Search
  CPC .... B23K 37/04; B23K 15/0013; B23K 26/02; B23K 26/0876; B23K 26/38; B23K 26/03; B23K 37/0235; B23K 37/0461; B26F 3/004
  See application file for complete search history.

(56) References Cited

U.S. PATENT DOCUMENTS

| | | | |
|---|---|---|---|
| 2010/0193479 A1* | 8/2010 | Takada | B23K 37/0461 219/121.6 |
| 2014/0014625 A1 | 1/2014 | Yamaoka et al. | |
| 2014/0083983 A1 | 3/2014 | Brookhyser et al. | |
| 2014/0216223 A1 | 8/2014 | Epperlein et al. | |
| 2016/0288257 A1 | 10/2016 | Magnus et al. | |
| 2016/0297036 A1 | 10/2016 | Schmauder et al. | |
| 2016/0311069 A1 | 10/2016 | Magnus et al. | |
| 2019/0247961 A1 | 8/2019 | Ottnad et al. | |
| 2021/0138589 A1* | 5/2021 | Bader | B23K 26/38 |

FOREIGN PATENT DOCUMENTS

| | | | |
|---|---|---|---|
| CN | 103874560 A | 6/2014 | |
| CN | 104684677 A | 6/2015 | |
| CN | 105478891 | 4/2016 | |
| CN | 105829008 A | 8/2016 | |
| CN | 105829015 A | 8/2016 | |
| CN | 105899322 A | 8/2016 | |
| DE | 195 03 377 | 1/1996 | ............ B23H 7/02 |
| DE | 102010042561 | 3/2012 | ............ B23K 26/38 |
| DE | 102011051170 | 12/2012 | ............ B23K 26/42 |
| DE | 102012212566 | 1/2014 | ............ B23K 26/38 |
| DE | 102013226818 | 6/2015 | ............ B23Q 3/00 |
| EP | 1916042 | 4/2008 | |
| JP | 2015-225155 | 12/2015 | ............ G03G 21/20 |
| WO | WO 2007/134631 | 11/2007 | ............ B23K 26/42 |
| WO | WO 2016/020411 | 2/2016 | ............ B23K 7/00 |
| WO | WO-2016020411 A1 * | 2/2016 | ............ B23K 10/00 |
| WO | WO 2018/077763 | 5/2018 | ............ B23K 37/02 |

OTHER PUBLICATIONS

CN Search Report in Chinese Appln. No. 201780065804.1, dated Jul. 24, 2020, 2 pages (with English translation).
Fa, "Welding Method and Practice," Jul. 31, 2014, 91-92.
German Office Action for German Application No. DE 10 2016 220 844.6 dated Sep. 22, 2017.
The International Search Report and Written Opinion for International Application No. PCT/EP2017/076925 dated Jul. 7, 2018.
Database WPI Week 198507, Thomson Scientific, London, GB XP002778655 (Jul. 7, 1984).
CN Decision to Grant in Chinese Appln. No. 201780065804.1, dated Apr. 6, 2021, 8 pages (with English translation).

* cited by examiner

PREDICTING THE TILT INCLINATION OF A WORKPIECE PORTION AND SEPARATING A PLATE-LIKE WORKPIECE

CROSS REFERENCE TO RELATED APPLICATIONS

This application is a continuation of and claims priority under 35 U.S.C. § 120 from PCT Application No. PCT/EP2017/076925, filed on Oct. 20, 2017, which claims priority from German Application No. 10 2016 220 844.6, filed on Oct. 24, 2016. The entire contents of each of these priority applications are incorporated herein by reference.

TECHNICAL FIELD

The invention relates to a method of predicting the tilt inclination of a workpiece portion that is cut free from a remaining workpiece during a separating processing operation.

BACKGROUND

When cutting free workpiece portions on a laser cutting installation, for example, a flat-bed cutting installation, a combined laser punching machine or hybrid installations, the workpiece portions which have been cut free can tilt as a result of their weight force and/or as a result of the action of the cutting gas pressure. This may lead to problems in following processes. When cutting additional workpiece portions, collisions may occur or the workpiece portion can no longer automatically be removed from the machine.

DE 10 2013 226 818 A1 discloses a machine for separating processing of a plate-like workpiece using a processing beam. The machine has two workpiece support faces for support of the workpiece, between which a gap which extends in one direction is formed. Within the gap, there are arranged at least two support carriages which can be moved independently of each other and which each have a support face for supporting workpiece portions which are cut during the separating processing operation. It has been found that these support carriages are not sufficient to reliably prevent tilting of workpiece portions which have been cut out when the respective free-cutting position of the workpiece portions is selected at an incorrect location.

SUMMARY

This disclosure relates to a method of predicting the tilt inclination of a workpiece portion that is cut free from a remaining workpiece during a separating processing operation by means of a processing machine and which rests on one or more supports. Furthermore, the disclosure relates to a processing machine for a separating processing operation of a plate-like workpiece using a processing beam having a processing head which directs the processing beam, in particular laser beam, onto the plate-like workpiece.

An object of the present invention is to provide a method and a processing machine by means of which it is possible to prevent tilting of workpiece portions which have been cut free.

This object is achieved according to a first aspect of the invention by a method for predicting the tilt inclination of a workpiece portion which is cut free from a remaining workpiece during a separating processing operation by means of a processing machine and which rests on one or more supports, having the method steps of:

a) establishing one or more possible tilting edges, about which the workpiece portion which has been cut free could tilt;

b) for at least one possible tilting edge, in particular for each possible tilting edge: establishing tilting moments which act on the workpiece portion in different states of the processing machine; and c) using the tilting moments which have been established: establishing whether the workpiece portion would tilt about a tilting edge.

There are thus first analyzed the possible tilting edges, about which a workpiece portion which has been cut free could tilt. Then, different states of the processing machine are analyzed and there are evaluated the tilting moments which could act on the workpiece portion in the different states. For example, one state of the processing machine is the workpiece processing operation, in which, for example, a cutting gas is discharged from a processing head and at the time of the free-cutting in a free-cutting position acts on the workpiece portion. Other tilting moments also then act on the workpiece portion when the cutting gas is switched off.

Preferably, the tilting moments (M1-M4) which are applied as a result of the weight force of the workpiece portion and those applied as a result of the process force of a fluid (for example, water or cutting gas) acting on the workpiece portion at a free-cutting position are established. Depending on the ratio of the acting forces or tilting moments, it may be the case that in a processing state tilting is prevented since the discharged gas prevents the workpiece from tilting as a result of the inherent weight thereof. On the other hand, the gas can apply such a significant force to the workpiece portion that the gas is responsible for tilting the workpiece portion, which would not tilt if no gas were to flow onto the workpiece portion. The free-cutting position is in this instance the position at which the last connection of the workpiece portion with respect to the remaining workpiece is separated. The workpiece portion which is cut free may be both a useful portion or a residual portion which is disposed of.

Using the tilting moments established, it can then be established whether there is a machine state in which the workpiece portion would tilt about a tilting edge. If this is predicted, appropriate measures can be taken to prevent such tilting. For example, another free-cutting position can be selected or a support can be positioned differently or the workpiece can be arranged differently on the supports in order to prevent tilting of a workpiece portion which has been cut out.

The tilting edge can be established depending on whether the workpiece portion which has been cut out rests on one or more supports. If the workpiece portion rests on only one support, the intersection line of the workpiece portion with a support edge can be determined as the tilting edge.

If the workpiece portion rests on a plurality of supports which are spaced apart from each other, the portions of the workpiece portion which are arranged between supports can be masked and the convex hull of the remaining workpiece portion can be determined, wherein the tilting edges are determined as the straight connection lines from the intersections of the convex hull with the support edges which are located on the outer geometry of the convex hull. Straight connection lines which are located in the convex hull or intersect with it are not tilting edges.

If, for example, the workpiece portion which has been cut free rests on two supports, the portions of the workpiece portion between the supports are masked. From the remaining locations of the workpiece portion which has been cut free, the convex hull is formed and it intersects with the edges of the supports. Consequently, four cutting locations are produced. Two of these cutting locations can be connected by a straight line, respectively. The straight lines form the tilting edges. In this instance, therefore, it is verified at two different tilting edges whether the workpiece portion which has been cut free would potentially tilt.

In order to establish the tilting moments acting on the workpiece portion at the tilting edges, the weight force of the workpiece portion which has been cut free, the centre of gravity of the workpiece portion and the spacing of the centre of gravity from a tilting edge, in particular from each tilting edge, can be established. The spacing of the centre of gravity from the tilting edge represents the lever arm which can be used in order to establish a tilting movement which has been brought about by the weight force of the workpiece portion at the tilting edge.

Furthermore, in order to establish the tilting moments, a process force acting in the free-cutting position, in particular a gas force of a cutting gas which is discharged from a processing head and which strikes the workpiece portion which has been cut free can be established. In principle, the method can be used for any type of processing beam. It may in this instance be a high-energy beam, for example, in the form of a plasma arc or a water jet. However, it is particularly preferable for the processing beam to be a laser beam. During laser cutting, a cutting gas which strikes the workpiece is used. Consequently, as a result of the discharged cutting gas a force is applied to the workpiece and could lead to tilting of the workpiece. Approximately, this gas force can be established as the product of the gas pressure and the nozzle cross-section of a processing nozzle of a processing head. It is also conceivable to establish the gas force more precisely by means of more detailed models.

There may further be provision for the spacing of the free-cutting position with respect to a tilting edge, in particular with respect to each tilting edge, to be established. This spacing consequently represents the lever arm which can be used to calculate a tilting moment which is produced when in the free-cutting position a force acts on the workpiece portion which has been cut free, such as, for example, a process force, in particular a gas force.

From the tilting moments caused by the weight force and the gas force, a tilting moment equilibrium can be established at the tilting edge(s) of the workpiece portion which has been cut free and it can consequently be verified whether the workpiece portion which has been cut free would tilt.

Particular advantages are afforded when a sign is assigned to each established spacing. Each spacing or lever arm which counteracts tilting about a tilting edge may for example, be assigned a positive sign and each lever arm which could lead to tilting can be assigned a negative sign.

According to another embodiment of the method for each tilting edge a tilting moment for the pure action of the weight force of the workpiece portion and a resulting tilting moment for the simultaneous action of the process force and weight force may be determined and subsequently a minimum of the tilting moments established in this manner may be formed and the minimum may be compared with a reference value. The reference value may, for example, be selected to be equal to zero.

If it is accordingly the case that with a selected free-cutting position the smallest tilting moment is positive, this indicates that the workpiece portion would not tilt during and after the free-cutting. In order to provide additional certainty, the reference value can be selected to be greater than zero. If accordingly the smallest tilting moment is greater than this positive reference value, it is ensured that the workpiece portion which has been cut free would not tilt for the verified free-cutting position.

A free-cutting position for the workpiece processing can be selected in such a manner and/or a processing machine can be adjusted in such a manner that tilting of the workpiece portion which has been cut free is prevented. If accordingly the analysis or prediction in accordance with the method according to the invention sets out that for a verified free-cutting position there is no risk of tilting of the workpiece portion which has been cut free, the free-cutting position can be maintained. Otherwise, another free-cutting position can be selected and verified. Alternatively, it is conceivable for the workpiece or the support(s) to be positioned differently so that, for a selected free-cutting position, there is no risk of tilting of the workpiece portion which has been cut free.

The scope of the invention further includes a processing machine for a separating processing operation of a plate-like workpiece using a processing beam having a processing head which directs the processing beam, in particular laser beam, onto the plate-like workpiece, and at least one support on which a workpiece portion which has been cut free by means of a separating processing operation can rest, having a control device which taking into account the tilt inclination of the workpiece portion which has been cut free as established in the method according to the invention is configured and/or programmed in particular to determine a free-cutting position in such a manner and/or to control the position of the support and/or the positioning of the workpiece portion in such a manner that the workpiece portion which has been cut free does not tilt.

According to the invention the end position of a workpiece portion which has been cut free in a processing machine for a selected free-cutting position is accordingly established. Furthermore, a gas force and the gravitational force of the workpiece portion which has been cut free can be established. From this, using a tilting moment equilibrium and a geometrically established tilting edge, it can be evaluated whether the workpiece portion which has been cut free will tilt. Subsequently, where applicable, a new free-cutting position can be selected and/or a position of the support or of the workpiece can be changed and the tilt inclination of the workpiece portion which has been cut free can again be verified in order ultimately to establish a free-cutting position and/or a position of the support relative to the workpiece portion, in which there is no tilting inclination of the workpiece portion.

Other advantages of the invention will be appreciated from the description and the drawings. The features mentioned above and those set out below can also be used individually per se or together in any combinations. The embodiments shown and described are not intended to be understood to be a definitive listing, but are instead of an exemplary nature in order to describe the invention.

DETAILED DESCRIPTION

Figure 1:
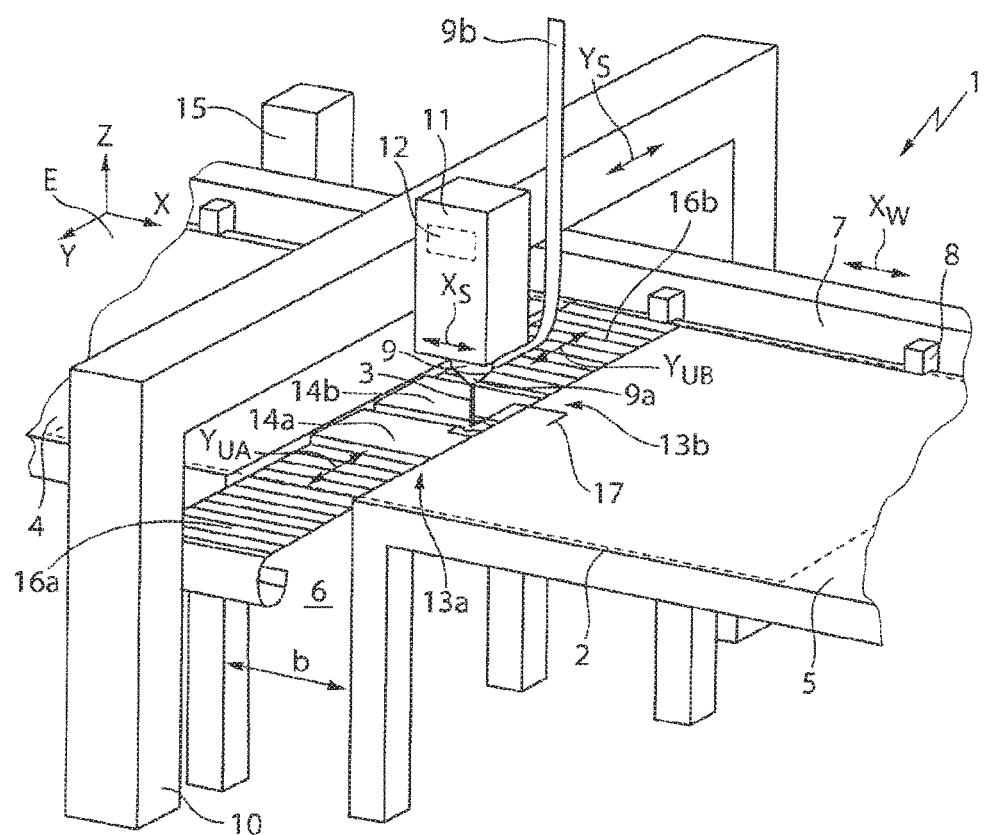
FIG. 1 is an illustration of an embodiment of a laser processing machine with two support carriages which can be moved in a gap during a separating processing operation of a plate-like workpiece.

FIG. 1 shows an exemplary construction of a machine 1 for laser processing, more specifically for laser cutting, a plate-like workpiece 2 which is illustrated with dashed lines using a laser beam 3. For the cutting processing operation of the workpiece 2, in place of the laser beam 3, another type of thermal processing beam, for example, a plasma flare, or a water jet can also be used. The workpiece 2 rests during the processing operation on two workpiece support faces 4, 5 which in the example shown form the upper sides of two workpiece tables and define a support plane E (X-Y plane of an XYZ coordinate system) for supporting the workpiece 2. The workpiece support faces 4, 5 may be formed by table surfaces or by means of pin-like support elements (pins), support strips, brushes, rollers, balls, air cushions or the like.

Using a conventional movement and retention device 7 which has a drive and clamping devices 8 in the form of clamping jaws for retaining the workpiece 2, the workpiece 2 can be displaced in a controlled manner on the workpiece support faces 4, 5 in a first movement direction X (below: X direction) and moved to a predetermined workpiece position W. In order to facilitate the movement of the workpiece 2 in the X direction, brushes, balls or sliding rollers may be fitted to the workpiece tables shown in FIG. 1 and constitute the actual support faces 4, 5. Alternatively, it is, for example, possible in order to move or to support the movement of the workpiece 2 in the X direction to construct the workpiece support faces 4, 5 themselves as a movement device, for example, in the form of a (revolving) conveyor belt, as described in DE 10 2011 051 170 A1 from the same Applicant, or in the form of a workpiece support, as described in JP 06170469.

There is formed between the two workpiece support faces 4, 5 a gap 6 which extends in a second direction (below: Y direction) over the entire movement path of a processing head 9 which is constructed as a laser cutting head and which directs and focuses the laser beam 3 onto the workpiece 2. The processing head 9 can be moved in a controlled manner inside the gap 6 in a Y direction by means of a driven carriage 11 which acts as a movement device and which is guided on a fixed portal 10. The processing head 9 can further in the example shown also be moved inside the gap 6 in a controlled manner in the X direction and, using an additional movement device 12 which is fitted to the carriage 11, for example, in the form of a linear drive, can be moved in a controlled manner in the X direction. The maximum movement path of the processing head 9 in the X direction is in the example shown smaller than the width b of the gap 6.

Using the movement devices 11, 12 which are constructed one on the other, the processing head 9 can be positioned both in the X direction and in the Y direction at a desired cutting head position Xs, Ys within the gap 6. Where applicable, the processing head 9 can also be moved in a third movement direction Z (direction of gravitational force, below: Z direction) in order to adjust the spacing between the processing nozzle 9a and the workpiece surface. From the processing nozzle 9a, a gas is discharged downwards in the Z direction and is supplied to the processing head 9 via gas lines 9b which are merely indicated.

There are arranged within the gap 6 two support carriages 13a, 13b which each extend over the entire width b of the gap 6 and which can be moved in the gap 6 in the Y direction in a controlled manner and independently of each other. The controlled movement of the support carriages 13a, 13b in the gap 6 may, for example, be carried out using spindle drives, wherein the spindle nut is fitted to the respective support carriage 13a, 13b and the spindle and the drive motor are fitted to one of the two fixed workpiece supports 4, 5. Of course, the controlled movement of the support carriages 13a, 13b in the gap 6 can also be implemented in a different manner.

The support carriages 13a, 13b can be moved in the gap 6 in each case to a desired position YUA, YUB in the Y direction in order at that location to support the workpiece 2, more specifically workpiece portions which are intended to be cut free or which have been cut free from the workpiece 2 during the processing operation, using a support 14a, 14b which is fitted to the respective support carriage 13a, 13b and which is in the form of a support face. The support face of a respective support carriage 13a, 13b terminates in the case illustrated in the Z direction in a flush manner with the workpiece support faces 4, 5, that is to say, the support faces are located in the support plane E for the workpiece 2.

In order to control the cutting processing operation, the machine 1 has a control device 15 which is used to coordinate the movements of the workpiece 2, the processing head 9 and the support carriages 13a, 13b in order to adjust a desired workpiece position W, a desired cutting head position Xs, Ys and a desired position YUA, YUB of the support carriages 13a, 13b in order to enable the cutting of a predetermined cutting contour and to support the workpiece where necessary in the region of the gap 6 and in particular to position it in such a manner that a workpiece portion 18 which has been cut free does not tip away from a support 14a, 14b. The method according to the invention can be carried out in the control device 15 or with an external programming system, that is to say, with a programming software item which runs on a separate computer and which produces as a result a sequence program for processing the workpiece 2.

The reference numerals 16a, 16b indicate covering elements for covering the gap 6.

The movement of the support carriages 13a, 13b can be carried out synchronously, that is to say, the spacing between the position YUA of the first support carriage 13a and the position YUB of the second support carriage in the Y direction during the movement is constant. The movement of the first support carriage 13a can also be carried out independently of the movement of the second support carriage 13b, that is to say, the spacing between the position YUA of the first support carriage 13a and the position YUB of the second support carriage 13b in the Y direction changes during the movement in the Y direction.

Figure 2:
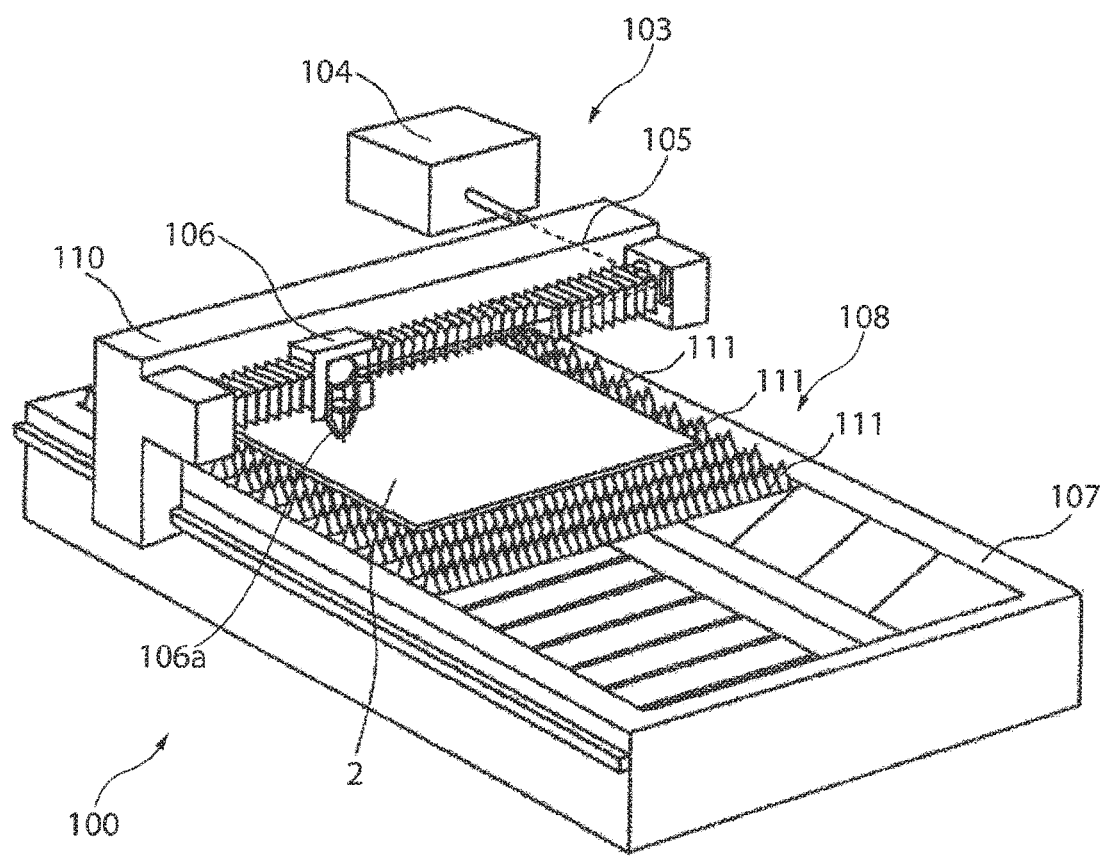
FIG. 2 shows an alternative embodiment of a laser processing machine for a separating processing operation of a plate-like workpiece.

FIG. 2 shows another laser processing machine 100 for laser cutting plate-like workpieces 2. The laser processing machine 100 comprises a cutting device 103 having a laser device 104, an external beam guide 105 and a processing head 106 and an operating table 107 having a workpiece support 108. The processing head 106 has a processing nozzle 106a, from which a gas is discharged in a downward direction.

The processing head 106 is fitted to a transverse carrier 110 and can be moved in a plane parallel with the workpiece support 108.

The workpiece support 108 is formed by a large number of supports 111 having carrier location tips which are preferably constructed in a triangular manner and which define a support plane for the workpiece 2 which is intended to be processed. The supports 111 are arranged in a predefined pattern. Workpiece portions which have been cut free from the workpiece 2 are also located on the supports 111.

Figure 3:
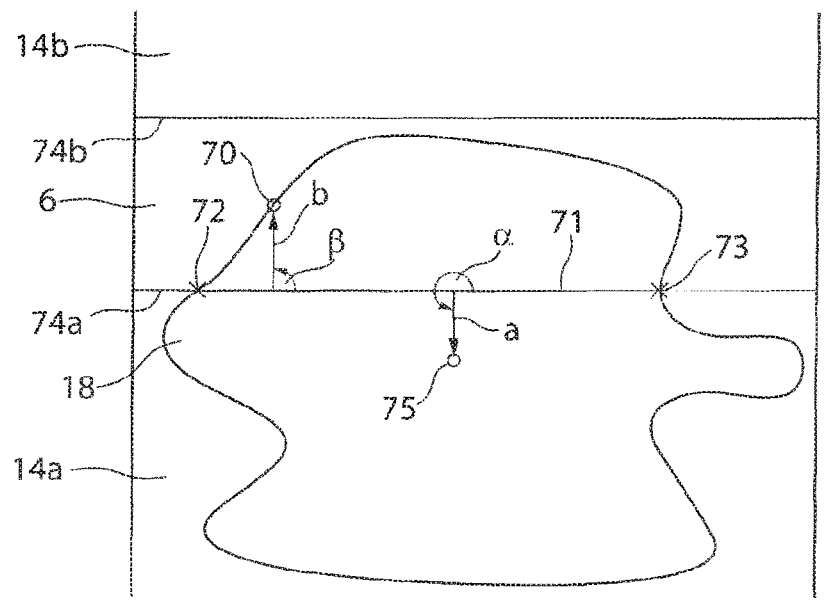
FIG. 3 is a schematic drawing to explain the method according to the invention when a workpiece which has been cut free is supported on a support.

FIG. 3 shows in a highly schematic manner the gap 6 of the laser processing machine according to FIG. 1. The supports 14a, 14b and a workpiece portion 18 which has been cut free can further be seen. This portion 18 rests only on the support 14a. A free-cutting position is designated 70. In order to verify whether in this free-cutting position 70 there is a risk of tilting of the workpiece portion 18, the intersection line of the workpiece portion 18 with the support 14a is first determined. This is the line between the intersection locations 72, 73. In this instance, the tilting edge 71 coincides with the support edge 74a. Subsequently, the portion a or lever arm of the centre of gravity 75 of the workpiece portion 18 is determined. The spacing b or lever arm of the free-cutting position 70 with respect to the tilting edge 71 is also determined. The sign of the lever arms a, b is determined by means of the angle $\alpha$ or $\beta$ with respect to the tilting edge 71. The angle $\alpha$ is greater than 180°. Therefore, a positive sign is assigned to the spacing a. The angle $\beta$ is less than 180°. Therefore, a negative sign is assigned to the spacing b. Subsequently, tilting moments are calculated for different states of the processing machine 1. During a workpiece processing operation, that is to say, whilst gas flows in the direction of the workpiece portion 18, the tilting moment M1=a× weight force+b× gas force acts on the workpiece portion 18. If, however, the gas is switched off, the tilting moment M2=a× weight force acts on the workpiece portion 18.

Subsequently, the minimum of the tilting moments M1, M2 is formed. The free-cutting position 70 does not lead to a tilting of the workpiece portion 18 if the established minimal tilting moment is greater than zero, wherein zero was selected in this instance as a reference value. If a reference value greater than zero is selected and if the minimum tilting moment is greater than this reference value, a safety margin is maintained so that in any case the workpiece portion 18 does not tip away.

Figure 4:
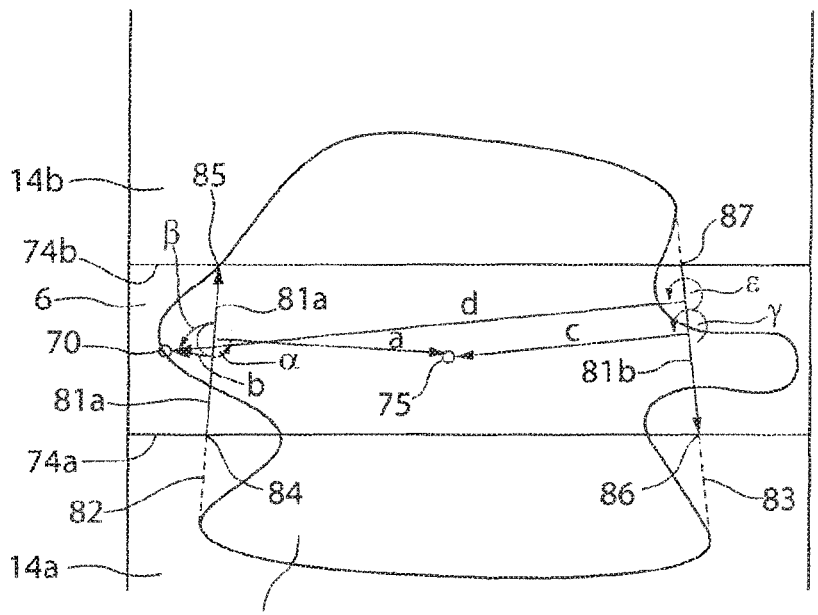
FIG. 4 is an illustration to clarify the method according to the invention using a workpiece which rests on two supports.

In the situation which is shown in FIG. 4, the workpiece portion 18 rests on both supports 14a, 14b. In this instance, the tilting edges 81a, 81b are produced by initially regions of the workpiece portion 18 which are located in the gap 6, that is to say, not over a support 14a, 14b, being masked. Using the remaining locations of the workpiece portion 18, the convex hull of the workpiece portion 18 is formed. This is indicated by the dashed lines 82, 83. The intersections 84-87 of this two-dimensional convex hull are now established using the support edges 74a, 74b. The straight line which connects the outermost intersections 84, 85 in each case forms the first tilting edge 81a and the straight line which connects the intersections 86, 87 forms the second tilting edge 81b. The spacing a of the centre of gravity 75 with respect to the first tilting edge 81a is also established similarly to the spacing b or lever arm of the free-cutting position 70 with respect to the first tilting edge 81a. The spacing c or lever arm of the centre of gravity 75 with respect to the second tilting edge 81b and the spacing d or lever arm of the free-cutting position 70 with respect to the second tilting edge 81b are also established. The spacings a, c, d are assigned a positive sign since the angles $\alpha$, $\gamma$ and $\epsilon$ are greater than 180°. The spacing b is assigned a negative sign since the angle $\beta$ is less than 180°. All the possible tilting moments for different states of the processing machine are now established:

$$M1 = a \times \text{weight force} + b \times \text{gas force}$$

$$M2 = a \times \text{weight force}$$

$$M3 = c \times \text{weight force} + d \times \text{gas force}$$

$$M4 = c \times \text{weight force}$$

Subsequently, the smallest tilting moment is output as the result by the minimum of the tilting moments M1 to M4 being formed. If the smallest tilting moment is positive or is above a predetermined reference value, for the examined free-cutting position 70 in no state of the processing machine is there any risk of tilting of the workpiece portion 18. If, however, the smallest established tilting moment is less than zero or less than a predetermined reference value, tilting may be anticipated so that the processing machine can be programmed accordingly, in particular the position of the supports 14a, 14b may have to be changed or the free-cutting position 70 may have to be changed until an analysis of the tilting moments shows that there is no risk of tilting.

What is claimed is:

1. A method of predicting a tilt of a workpiece portion that rests on one or more supports, the method comprising:
   determining, by a control device of a processing machine, one or more possible tilting edges about which the workpiece portion could tilt;
   determining, by the control device and for at least one possible tilting edge, tilting moments that act on the workpiece portion; and
   predicting, by the control device and using the determined tilting moments, whether the workpiece portion would tilt about at least one possible tilting edge;
   wherein the workpiece portion comprises a portion cut free from a workpiece during a separating processing operation by the processing machine;
   wherein determining the tilting moments comprises determining at least a first tilting moment that acts on the workpiece portion as a result of a weight force of the workpiece portion, and determining at least a second tilting moment that acts on the workpiece portion as a result of a process force of a fluid acting on the workpiece portion at a free-cutting position.

2. The method of claim 1, wherein the workpiece portion rests only on one support, and wherein determining the one or more possible tilting edges comprises determining that an intersection line of the workpiece portion with a support edge is at least one possible tilting edge.

3. The method of claim 1, further comprising:
   masking respective portions of the workpiece portion that are arranged between supports; and
   determining a convex hull of a remaining workpiece portion, and wherein determining the one or more possible tilting edges comprises determining straight connection lines between intersections of the convex hull with support edges of the supports, the intersections located on the outer geometry of the convex hull.

4. The method of claim 1, wherein determining the tilting moments comprises 1) determining the weight force of the workpiece portion, 2) determining the centre of gravity of the workpiece portion, and 3) determining a spacing of the centre of gravity from at least one tilting edge.

5. The method of claim 4, wherein determining the spacing of the centre of gravity from at least one tilting edge comprises determining the spacing of the centre of gravity from each tilting edge.

6. The method of claim 4, wherein determining the tilting moments comprises assigning a sign to each determined spacing of the centre of gravity.

7. The method of claim 1, wherein determining the tilting moments comprises determining the process force acting in the free-cutting position.

8. The method of claim 7, wherein determining the process force comprises determining a force of a cutting gas that is discharged from a processing head and that strikes the workpiece portion and a spacing of the free-cutting position with respect to at least one tilting edge.

9. The method of claim 8, wherein determining the force of the cutting gas comprises determining a force of the cutting gas that strikes the workpiece portion and the spacing of the free cutting portion with respect to each tilting edge.

10. The method of claim 8, wherein the processing head has a cutting gas nozzle from which the cutting gas is discharged, and wherein the gas force is determined from the cutting gas pressure and the opening diameter of the cutting gas nozzle.

11. The method of claim 1, further comprising determining a minimum tilting moment of the tilting moments.

12. The method of claim 11, wherein predicting whether the workpiece portion would tilt about at least one tilting edge comprises comparing the minimum tilting moment with a reference value, and wherein predicting the tilt of the workpiece portion comprises determining that the minimum tilting moment is less than the reference value.

13. The method of claim 1, further comprising selecting the free-cutting position such that tilting of the workpiece portion is prevented.

14. The method of claim 1, further comprising adjusting the processing machine such that tilting of the workpiece portion is prevented.

15. The method of claim 1, wherein determining the tilting moments comprises determining the tilting moments for each possible tilting edge.

16. The method of claim 1, wherein determining the tilting moments comprises determining the tilting moments that act on the workpiece portion in different states of the processing machine.

17. A processing machine comprising:
a processing head configured to direct a processing beam onto a plate-like workpiece for a separating processing operation of the plate-like workpiece to cut free a workpiece portion; and
at least one support on which the workpiece portion can rest;
wherein a control device is configured to control the processing machine to prevent the workpiece from tilting in response to information collected and analyzed by the control device, the control device configured to take into account the tilt inclination of the workpiece portion as predicted by the processing machine, the control device configured to:
determine one or more possible tilting edges about which the workpiece portion could tilt;
determine, for at least one possible tilting edge, tilting moments that act on the workpiece portion; and
predict, using the determined tilting moments, whether the workpiece portion would tilt about a tilting edge;
wherein determining the tilting moments comprises determining at least a first tilting moment that acts on the workpiece portion as a result of a weight force of the workpiece portion, and determining at least a second tilting moment that acts on the workpiece portion as a result of a process force of a fluid acting on the workpiece portion at a possible free-cutting position.

18. The processing machine of claim 17, wherein the control device is configured to control the processing machine to cut the workpiece portion free at the free-cutting position, the free-cutting position selected by the control device, the control device configured to:
predict, using the determined tilting moments, that the workpiece portion would not tilt about a tilting edge; and
select, upon predicting that the workpiece portion will not tilt, the free-cutting position for the workpiece portion.

19. A method of determining a free-cutting position for a workpiece portion that rests on one or more supports, the method comprising:
determining, by a control device of a processing machine, one or more possible tilting edges about which the workpiece portion could tilt;
determining, by the control device and for at least one possible tilting edge, tilting moments that act on the workpiece portion;
predicting, by the control device and using the determined tilting moments, that the workpiece portion would not tilt about at least one possible tilting edge; and
selecting, by the control device, upon predicting that the workpiece portion will not tilt, the free-cutting position for the workpiece portion;
wherein the workpiece portion comprises a portion cut free from a workpiece during a separating processing operation by the processing machine;
wherein determining the tilting moments comprises determining at least a first tilting moment that acts on the workpiece portion as a result of a weight force of the workpiece portion, and determining at least a second tilting moment that acts on the workpiece portion as a result of a process force of a fluid acting on the workpiece portion at the free-cutting position.

* * * * *